United States Patent
Minor

(10) Patent No.: US 9,523,027 B2
(45) Date of Patent: Dec. 20, 2016

(54) REFRIGERANT MIXTURES COMPRISING TETRAFLUOROPROPENE, DIFLUOROMETHANE, PENTAFLUOROETHANE, AND TETRAFLUOROETHANE AND USES THEREOF

(71) Applicant: CHEMOURS COMPANY FC LLC, Wilmington, DE (US)

(72) Inventor: Barbara Haviland Minor, Elkton, MD (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 0 days.

(21) Appl. No.: 14/374,631

(22) PCT Filed: Feb. 12, 2013

(86) PCT No.: PCT/US2013/025656
§ 371 (c)(1),
(2) Date: Jul. 25, 2014

(87) PCT Pub. No.: WO2013/122892
PCT Pub. Date: Aug. 22, 2013

(65) Prior Publication Data
US 2015/0033770 A1 Feb. 5, 2015

Related U.S. Application Data

(60) Provisional application No. 61/598,120, filed on Feb. 13, 2012.

(51) Int. Cl.
C09K 5/04 (2006.01)
C10M 171/00 (2006.01)
F25B 45/00 (2006.01)
F25B 1/00 (2006.01)

(52) U.S. Cl.
CPC .......... C09K 5/045 (2013.01); C10M 171/008 (2013.01); F25B 1/005 (2013.01); F25B 45/00 (2013.01); C09K 2205/126 (2013.01); C09K 2205/22 (2013.01); C09K 2205/32 (2013.01); C09K 2205/40 (2013.01); C09K 2205/43 (2013.01); C10N 2220/302 (2013.01); C10N 2230/64 (2013.01); F25B 2345/001 (2013.01)

(58) Field of Classification Search
CPC .............. C09K 5/045; C09K 2205/126; C09K 2205/22
See application file for complete search history.

(56) References Cited

U.S. PATENT DOCUMENTS

| 5,399,549 A | 3/1995 | Felix et al. |
| 8,024,937 B2 | 9/2011 | Minor |
| 2004/0256594 A1 | 12/2004 | Singh et al. |
| 2006/0106263 A1 | 5/2006 | Miller et al. |
| 2006/0243944 A1 | 11/2006 | Minor et al. |
| 2006/0243945 A1 | 11/2006 | Minor et al. |
| 2007/0284555 A1 | 12/2007 | Leck et al. |
| 2009/0278075 A1 | 11/2009 | Mahler et al. |
| 2010/0122545 A1 | 5/2010 | Minor et al. |
| 2011/0219815 A1* | 9/2011 | Motta ............... C09K 5/045 62/498 |
| 2013/0096218 A1 | 4/2013 | Rached et al. |

FOREIGN PATENT DOCUMENTS

| WO | 2010/059677 A2 | 5/2010 |
| WO | 2010/129920 A1 | 11/2010 |
| WO | 2011/161419 A1 | 12/2011 |
| WO | 2011/163117 A1 | 12/2011 |
| WO | 2012/151238 A2 | 11/2012 |
| WO | 2013/122892 A1 | 8/2013 |

OTHER PUBLICATIONS

PCT International Search Report and Written Opinion (PCT/US2013/025656) Mailed Apr. 17, 2013.
ASHRAE Standard Designation and Safety Classification of Refrigerants, ANSI/ASHRAE Standard 34-2010, Atlanta, Ga.
ASTM International Designation: E 681-01, Standard Test Method for Concentration Limits of Flammability of Chemicals (Vapors and Gases), 2001, pp. 1-12, West Conshohocken, PA.

* cited by examiner

Primary Examiner — John Hardee
(74) Attorney, Agent, or Firm — N. Lynn Tucker

(57) ABSTRACT

A non-flammable refrigerant mixture is disclosed. The non-flammable refrigerant mixture consists essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and (e) from about 0.0001 weight percent to 10 weight percent trans-HFO-1234ze. These refrigerant mixtures are useful as components in compositions also containing non-refrigerant components (e.g. lubricants), in processes to produce cooling, in methods for replacing refrigerant R-404A or R-507, and in refrigeration apparatus.

9 Claims, No Drawings

REFRIGERANT MIXTURES COMPRISING TETRAFLUOROPROPENE, DIFLUOROMETHANE, PENTAFLUOROETHANE, AND TETRAFLUOROETHANE AND USES THEREOF

This application represents a national filing under 35 U.S.C. 371 of International Application No. PCT/US13/25656 filed Feb. 12, 2013, and claims priority of U.S. Provisional Application No. 61/598,120 filed Feb. 13, 2012.

BACKGROUND

Field of the Disclosure

The present disclosure relates to compositions for use in refrigeration systems. In particular these compositions are useful in processes for producing cooling, methods for replacing refrigerants and refrigeration apparatus.

Description of Related Art

The refrigeration industry has been working for the past few decades to find replacement refrigerants for the ozone depleting chlorofluorocarbons (CFCs) and hydrochlorofluorocarbons (HCFCs) being phased out as a result of the Montreal Protocol. The solution for most refrigerant producers has been the commercialization of hydrofluorocarbon (HFC) refrigerants. The new HFC refrigerants, HFC-134a being the most widely used at this time, have zero ozone depletion potential and thus are not affected by the current regulatory phase out as a result of the Montreal Protocol.

Further environmental regulations may ultimately cause global phase out of certain HFC refrigerants. Currently, industry is facing regulations relating to global warming potential (GWP) for refrigerants used in mobile air-conditioning. Should the regulations be more broadly applied in the future, for instance for stationary air conditioning and refrigeration systems, an even greater need will be felt for refrigerants that can be used in all areas of the refrigeration and air-conditioning industry. Uncertainty as to the ultimate regulatory requirements relative to GWP, have forced the industry to consider multiple candidate compounds and mixtures.

Previously proposed replacement refrigerants for HFC refrigerants and refrigerant blends include HFC-152a, pure hydrocarbons, such as butane or propane, or "natural" refrigerants such as $CO_2$. Each of these suggested replacements has problems including toxicity, flammability, low energy efficiency, or requires major equipment design modifications. New replacements are also being proposed for HCFC-22, R-134a, R-404A, R-507, R-407C and R-410A, among others. Uncertainty as to what regulatory requirements relative to GWP will ultimately be adopted have forced the industry to consider multiple candidate compounds and mixtures that balance the need for low GWP, non-flammability, and existing system performance parameters.

BRIEF SUMMARY

Certain compositions comprising tetrafluoropropene, difluoromethane, pentafluoroethane and tetrafluoroethane have been found to possess suitable properties to allow their use as replacements of higher GWP refrigerants currently in use, in particular R-404A and R507.

In accordance with the present invention a non-flammable refrigerant mixture is provided. The non-flammable refrigerant mixture consists essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and (e) from about 0.0001 weight percent to 10 weight percent HFO-1234ze.

These refrigerant mixtures are useful as components in compositions also containing non-refrigerant components (e.g. lubricants), in processes to produce cooling, in methods for replacing refrigerant R-404A or R-507, and in refrigeration apparatus.

DETAILED DESCRIPTION

Before addressing details of embodiments described below, some terms are defined or clarified.

Definitions

As used herein, the term heat transfer fluid means a composition used to carry heat from a heat source to a heat sink.

A heat source is defined as any space, location, object or body from which it is desirable to add, transfer, move or remove heat. Examples of heat sources are spaces (open or enclosed) requiring refrigeration or cooling, such as refrigerator or freezer cases in a supermarket, building spaces requiring air conditioning, industrial water chillers or the passenger compartment of an automobile requiring air conditioning. In some embodiments, the heat transfer composition may remain in a constant state throughout the transfer process (i.e., not evaporate or condense). In other embodiments, evaporative cooling processes may utilize heat transfer compositions as well.

A heat sink is defined as any space, location, object or body capable of absorbing heat. A vapor compression refrigeration system is one example of such a heat sink.

A refrigerant is defined as a heat transfer fluid that undergoes a phase change from liquid to gas and back again during the cycle used to transfer of heat.

A heat transfer system is the system (or apparatus) used to produce a heating or cooling effect in a particular space. A heat transfer system may be a mobile system or a stationary system.

Examples of heat transfer systems are any type of refrigeration systems and air conditioning systems including, but are not limited to, air conditioners, freezers, refrigerators, heat pumps, water chillers, flooded evaporator chillers, direct expansion chillers, walk-in coolers, mobile refrigerators, mobile air conditioning units, dehumidifiers, and combinations thereof.

As used herein, mobile heat transfer system refers to any refrigeration, air conditioner or heating apparatus incorporated into a transportation unit for the road, rail, sea or air. In addition, mobile refrigeration or air conditioner units, include those apparatus that are independent of any moving carrier and are known as "intermodal" systems. Such intermodal systems include "container" (combined sea/land transport) as well as "swap bodies" (combined road/rail transport).

As used herein, stationary heat transfer systems are systems that are fixed in place during operation. A stationary heat transfer system may be associated within or attached to buildings of any variety or may be stand-alone devices located out of doors, such as a soft drink vending machine. These stationary applications may be stationary aft conditioning and heat pumps, including but not limited to chillers, high temperature heat pumps, residential, commercial or industrial air conditioning systems (including residential heat pumps), and including window, ductless, ducted, packaged terminal, and those exterior but connected to the building such as rooftop systems. In stationary refrigeration applications, the disclosed compositions may be useful in equipment including commercial, industrial or residential refrigerators and freezers, ice machines, self-contained coolers and freezers, flooded evaporator chillers, direct expansion chillers, walk-in and reach-in coolers and freezers, and combination systems. In some embodiments, the disclosed compositions may be used in supermarket refrigeration systems. Additionally, stationary applications may utilize a secondary loop system that uses a primary refrigerant to produce cooling in one location that is transferred to a remote location via a secondary heat transfer fluid.

Refrigeration capacity (also sometimes referred to as cooling capacity) is a term which defines the change in enthalpy of a refrigerant (or refrigerant mixture) in an evaporator per unit mass of refrigerant (or refrigerant mixture) circulated, or the heat removed by the refrigerant (or refrigerant mixture) in the evaporator per unit volume of refrigerant (or refrigerant mixture) vapor exiting the evaporator (volumetric capacity). The refrigeration capacity is a measure of the ability of a refrigerant (or refrigerant mixture) or heat transfer composition to produce cooling. Therefore, the higher the capacity, the greater the cooling that is produced. Cooling rate refers to the heat removed by the refrigerant (or refrigerant mixture) in the evaporator per unit time.

Coefficient of performance (COP) is the amount of heat removed in the evaporator divided by the required energy input to operate the cycle. The higher the COP, the higher is the energy efficiency. COP is directly related to the energy efficiency ratio (EER) that is the efficiency rating for refrigeration or air conditioning equipment at a specific set of internal and external temperatures.

The term "subcooling" refers to the reduction of the temperature of a liquid below that liquid's saturation point for a given pressure. The saturation point is the temperature at which the vapor is completely condensed to a liquid, but subcooling continues to cool the liquid to a lower temperature liquid at the given pressure. By cooling a refrigerant (or refrigerant mixture) liquid below the saturation temperature (or bubble point temperature), the net refrigeration capacity can be increased. Subcooling thereby improves refrigeration capacity and energy efficiency of a system. Subcool amount is the amount of cooling below the saturation temperature (in degrees).

Superheat is a term that defines how far above its saturation vapor temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant (or refrigerant mixture) within a component of a refrigerant system, exclusive of any subcooling or superheating. This term may be used to describe condensation or evaporation of a near azeotrope or non-azeotropic composition (or refrigerant mixture). When referring to the temperature glide of a refrigeration, air conditioning or heat pump system, it is common to provide the average temperature glide being the average of the temperature glide in the evaporator and the temperature glide in the condenser.

By azeotropic composition is meant a constant-boiling mixture of two or more substances that behave as a single substance. One way to characterize an azeotropic composition is that the vapor produced by partial evaporation or distillation of the liquid has the same composition as the liquid from which it is evaporated or distilled, i.e., the mixture distills/refluxes without compositional change. Constant-boiling compositions are characterized as azeotropic because they exhibit either a maximum or minimum boiling point, as compared with that of the non-azeotropic mixture of the same compounds. An azeotropic composition will not fractionate within a refrigeration or air conditioning system during operation. Additionally, an azeotropic composition will not fractionate upon leakage from a refrigeration or air conditioning system.

An azeotrope-like composition (also commonly referred to as a "near-azeotropic composition") is a substantially constant boiling liquid admixture of two or more substances that behaves essentially as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same. Herein, a composition is azeotrope-like if, after 50 weight percent of the composition is removed, such as by evaporation or boiling off, the difference in vapor pressure between the original composition and the composition remaining after 50 weight percent of the original composition has been removed is less than about 10 percent.

A non-azeotropic (also referred to as zeotropic) composition is a mixture of two or more substances that behaves as a simple mixture rather than a single substance. One way to characterize anon-azeotropic composition is that the vapor produced by partial evaporation or distillation of the liquid has a substantially different composition as the liquid from which it was evaporated or distilled, that is, the admixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if, after 50 weight percent of the composition is removed, such as by evaporation or boiling off, the difference in vapor pressure between the original composition and the composition remaining after 50 weight percent of the original composition has been removed is greater than about 10 percent.

As used herein, the term "lubricant" means any material added to a composition or a compressor (and in contact with any heat transfer composition in use within any heat transfer system) that provides lubrication to the compressor to aid in preventing parts from seizing.

As used herein, compatibilizers are compounds which improve solubility of the hydrofluorocarbon of the disclosed compositions in heat transfer system lubricants. In some embodiments, the compatibilizers improve oil return to the compressor. In some embodiments, the composition is used with a system lubricant to reduce oil-rich phase viscosity.

As used herein, oil-return refers to the ability of a heat transfer composition to carry lubricant through a heat transfer system and return it to the compressor. That is, in use, it is not uncommon for some portion of the compressor lubricant to be carried away by the heat transfer composition from the compressor into the other portions of the system. In such systems, if the lubricant is not efficiently returned to the compressor, the compressor will eventually fail due to lack of lubrication.

As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from 10 nanometers to about 775 nanometers may be detected.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681-04. The upper flammability limit ("UFL") is the maximum concentration of the heat transfer composition in air that is capable of propagating a flame through a homogeneous mixture of the composition and air under the same test conditions. In order to be classified by ASHRAE (American Society of Heating, Refrigerating and Air-Conditioning Engineers) as non-flammable, a refrigerant must be non-flammable under the conditions of ASTM E681-04 as formulated in the liquid and vapor phase as well as non-flammable in both the liquid and vapor phases that result during leakage scenarios.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced. For mixtures, a weighted average can be calculated based on the individual GWPs for each component.

Ozone depletion potential (ODP) is a number that refers to the amount of ozone depletion caused by a substance. The ODP is the ratio of the impact on ozone of a chemical compared to the impact of a similar mass of CFC-11 (fluorotrichloromethane). Thus, the ODP of CFC-11 is defined to be 1.0. Other CFCs and HCFCs have ODPs that range from 0.01 to 1.0. HFCs have zero ODP because they do not contain chlorine.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'. Typically, components of the refrigerant mixtures and the refrigerant mixtures themselves can contain minor amounts (e.g., less than about 0.5 weight percent total) of impurities and/or byproducts (e.g., from the manufacture of the refrigerant components or reclamation of the refrigerant components from other systems) which do not materially affect the novel and basic characteristics of the refrigerant mixture. For example, HFC-134a may contain minor amounts of HFC-134 as a byproduct from the manufacture of HFC-134a. Of specific note in connection with this invention is HFO-1234ze, which can be a byproduct of certain processes for producing HFO-1234yf (see e.g., US2009/0278075). However, it is noted that certain embodiments of the present invention by reciting HFO-1234ze as a separate component include HFO-1234ze whether OF not its presence materially affects the novel and basic characteristics of the refrigerant mixture (alone or together with other impurities and/or by-products which by themselves would not materially affect the novel and basic characteristics of the refrigerant mixture).

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

2,3,3,3-tetrafluoropropene may also be referred to as HFO-1234yf, HFC-1234yf, or R1234yf. HFO-1234yf may be made by methods known in the art, such as by dehydrofluorination 1,1,1,2,3-pentafluoropropane (HFC-245eb) or 1,1,1,2,2-pentafluoropropane (HFC-245cb).

Difluoromethane (HFC-32 or R32) is commercially available or may be made by methods known in the art, such as by dechlorofluorination of methylene chloride.

Pentafluoroethane (HFC-125 or R125) is commercially available or may be made by methods known in the art, such as dechlorofluorination of 2,2-dichloro-1,1,1-trifluoroethane as described in U.S. Pat. No. 5,399,549, incorporated herein by reference.

1,1,1,2-tetrafluoroethane (HFC-134a or R134a) is commercially available or may be made by methods know in the art, such as by the hydrogenation of 1,1-dichloro-1,2,2,2-tetrafluoroethane (i.e., CCl2FCF3 or CFC-114a) to 1,1,1,2-tetrafluoroethane.

1,3,3,3-tetrafluoropropene (HFO-1234ze) may be prepared by dehydrofluorination of a 1,1,1,2,3-pentafluoropropane (HFC-245eb, CF3CHFCH2F) or 1,1,1,3,3-pentafluoropropane (HFC-245fa, CF3CH2CHF2). The dehydrofluorination reaction may take place in the vapor phase in the presence or absence of catalyst, and also in the liquid phase by reaction with caustic, such as NaOH or KOH. These reactions are described in more detail in U.S. Patent Publication No. 2006/0106263, incorporated herein by reference. HFO-1234ze may exist as one of two configurational isomers, cis- or trans- (also referred to as the E- and Z-isomers respectively). Trans-HFO-1234ze is available commercially from certain fluorocarbon manufacturers (e.g., Honeywell International Inc., Morristown, N.J.).

Compositions

Disclosed are non-flammable refrigerant mixtures consisting essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and optionally (a) from about 0.0001 weight percent to 10 weight percent HFO-1234ze.

Also disclosed are non-flammable refrigerant mixtures consisting essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and (e) from about 0.0001 weight percent to 10 weight percent trans-HFO-1234ze.

In another embodiment, the non-flammable refrigerant mixtures contain from about 0.0001 weight percent to 5 weight percent HFO-1234ze. In another embodiment, the non-flammable refrigerant mixtures contain from about 1 weight percent to 10 weight percent HFO-1234ze. In yet another embodiment, the non-flammable refrigerant mixtures contain from about 1 weight percent to 5 weight percent trans-HFO-1234ze.

In another embodiment, the non-flammable refrigerant mixtures comprise (a) from 23 weight percent to 25.5 weight percent HFO-1234yf, (b) from 22 weight percent to 24.5 weight percent HFC-32, (c) from 24.5 weight percent to 27 weight percent HFC-125; (d) from 25.5 weight percent to 28 weight percent HFC-134a; and (e) from about 0.0001 weight percent to 5 weight percent trans-HFO-1234ze.

In another embodiment, the non-flammable refrigerant mixtures are azeotrope-like. In particular the ranges of refrigerant mixtures found to be azeotrope-like are those with from 20 weight percent to 25.5 weight percent HFO-1234yf, from 20 weight percent to 24.5 weight percent HFC-32, from 24.5 weight percent to 30 weight percent HFC-125, and from 25.5 weight percent to 30 weight percent HFC-134a. Additionally, refrigerant mixtures also containing trans-HFO-1234ze are found to be azeotrope-like with from 20 weight percent to 25.5 weight percent HFO-1234yf, from 20 weight percent to 24.5 weight percent HFC-32, from 24.5 weight percent to 30 weight percent HFC-125, from 25.5 weight percent to 30 weight percent HFC-134a and from about 0.0001 weight percent to about 1 weight percent HFO-1234ze.

In another embodiment, the non-flammable refrigerant mixtures contain trans-HFO-1234ze from about 0.0001 to about 0.1 weight percent.

In another embodiment, the non-flammable refrigerant mixtures are azeotrope-like and trans-HFO-1234ze when present is from about 0.0001 to about 0.1 weight percent.

HFO-1234yf and mixtures containing HFO-1234yf are being considered as low GWP replacements for certain refrigerants and refrigerant mixtures that have relatively high GWP. In particular, R-404A (ASHRAE designation for a mixture containing 44 wt % HFC-125, 52 wt % HFC-143a (1,1,1-trifluoroethane), and 4 wt % HFC-134a) has a GWP of 3922 and will be in need of replacement. Further, R-507 (ASHRAE designation for a mixture containing 50 wt % HFC-125 and 50 wt % HFC-143a), which has virtually identical properties to R404A and can therefore be used in many R404A systems, has a GWP equal to 3985, and therefore does not provide a lower GWP replacement for R404A, but will be in need of replacement as well.

In some embodiments, in addition to the tetrafluoropropene, difluoromethane, pentafluoroethane, tetrafluoroethane, the disclosed compositions may comprise optional non-refrigerant components.

In one embodiment, a composition is provided consisting of (i) a non-flammable refrigerant component; and optionally (ii) a non-refrigerant component; wherein the refrigerant component is a non-flammable refrigerant mixture consisting essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and optionally (e) from about 0.0001 weight percent to 10 weight percent trans-HFO-1234ze. Of note are compositions wherein, when the HFO-1234ze is present, it is least about 90% trans-HFO-1234ze or 95% trans-HFO-1234ze. Also of note are compositions wherein the weight ratio of HFC-134a to HFO-1234yf is greater than 1:1. Of particular note are compositions wherein the HFO-1234yf is about 25 weight percent of the composition and wherein the HFC-134a is about 26 weight percent of the composition.

In some embodiments, the optional non-refrigerant components (also referred to herein as additives) in the compositions disclosed herein may comprise one or more components selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional non-refrigerant components fit into one or more of these categories and may have qualities that lend themselves to achieve one or more performance characteristic.

In some embodiments, one or more non-refrigerant components are present in small amounts relative to the overall composition. In some embodiments, the amount of additive(s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 5 weight percent of the total composition or in an amount between about 0.1 weight percent to about 3.5 weight percent. The additive component(s) selected for the disclosed composition is selected on the basis of the utility and/or individual equipment components or the system requirements.

In some embodiments, the lubricant is a mineral oil lubricant. In some embodiments, the mineral oil lubricant is selected from the group consisting of paraffins (including straight carbon chain saturated hydrocarbons, branched carbon chain saturated hydrocarbons, and mixtures thereof), naphthenes (including saturated cyclic and ring structures), aromatics (those with unsaturated hydrocarbons containing one or more ring, wherein one or more ring is characterized by alternating carbon-carbon double bonds) and non-hydrocarbons (those molecules containing atoms such as sulfur, nitrogen, oxygen and mixtures thereof), and mixtures and combinations of thereof.

Some embodiments may contain one or more synthetic lubricant. In some embodiments, the synthetic lubricant is selected from the group consisting of alkyl substituted aromatics (such as benzene or naphthalene substituted with linear, branched, or mixtures of linear and branched alkyl groups, often generically referred to as alkylbenzenes), synthetic paraffins and napthenes, poly (alpha olefins), polyglycols (including polyalkylene glycols), dibasic acid esters, polyesters, polyol esters, neopentyl esters, polyvinyl ethers (PVEs), perfluoropolyethers (PFPEs) silicones, silicate esters, fluorinated compounds, phosphate esters, polycarbonates and mixtures thereof, meaning mixtures of the any of the lubricants disclosed in this paragraph.

The lubricants as disclosed herein may be commercially available lubricants. For instance, the lubricant may be paraffinic mineral oil, sold by BVA Oils as BVM 100 N; naphthenic mineral oils sold by Crompton Co. under the trademarks Suniso® 1GS, Suniso® 3GS and Suniso® 5GS; naphthenic mineral oil sold by Pennzoil under the trademark Sontex® 372LT; naphthenic mineral oil sold by Calumet Lubricants under the trademark Calumet® RO-30; linear alkylbenzenes sold by Shrieve Chemicals under the trademarks Zerol® 75, Zerol® 150 and Zerol® 500; and branched alkylbenzene sold by Nippon Oil as HAB 22; polyol esters (POEs) sold under the trademark Castrol® 100 by Castrol; polyalkylene glycols (PAGs) such as RL-488A from Dow Chemical; perfluoropolyethers (PFPEs) sold under the trademark Krytox® by E, L du Pont de Nemours; sold under the trademark Fomblin® by Ausimont; or sold under the trademark Demnum by Daikin Industries; and mixtures thereof, meaning mixtures of any of the lubricants disclosed in this paragraph.

The lubricants used with the present invention may be designed for use with hydrofluorocarbon refrigerants and may be miscible with compositions as disclosed herein under compression refrigeration and air-conditioning apparatus' operating conditions. In some embodiments, the lubricants are selected by considering a given compressor's requirements and the environment to which the lubricant will be exposed.

In the compositions of the present invention including a lubricant, the lubricant is present in an amount of less than 5.0 weight percent to the total composition. In other embodiments, the amount of lubricant is between about 0.1 and 3.5 weight percent of the total composition.

Notwithstanding the above weight ratios for compositions disclosed herein, it is understood that in some heat transfer systems, while the composition is being used, it may acquire additional lubricant from one or more equipment components of such heat transfer system. For example, in some refrigeration, air conditioning and heat pump systems, lubricants may be charged in the compressor and/or the compressor lubricant sump. Such lubricant would be in addition to any lubricant additive present in the refrigerant in such a system. In use, the refrigerant composition when in the compressor may pick up an amount of the equipment lubricant to change the refrigerant-lubricant composition from the starting ratio.

In such heat transfer systems, even when the majority of the lubricant resides within the compressor portion of the system, the entire system may contain a total composition with as much as about 75 weight percent to as little as about 1.0 weight percent of the composition being lubricant. In some systems, for example supermarket refrigerated display cases, the system may contain about 3 weight percent lubricant (over and above any lubricant present in the refrigerant composition prior to charging the system) and 97 weight percent refrigerant.

The non-refrigerant component used with the compositions of the present invention may include at least one dye. The dye may be at least one ultra-violet (UV) dye. The UV dye may be a fluorescent dye. The fluorescent dye may be selected from the group consisting of naphthalimides, perylenes, coumarins, anthracenes, phenanthracenes, xanthenes, thioxanthenes, naphthoxanthenes, fluoresceins, and derivatives of said dye, and combinations thereof, meaning mixtures of any of the foregoing dyes or their derivatives disclosed in this paragraph.

In some embodiments, the disclosed compositions contain from about 0.001 weight percent to about 1.0 weight percent UV dye. In other embodiments, the UV dye is present in an amount of from about 0.005 weight percent to about 0.5 weight percent; and in other embodiments, the UV dye is present in an amount of from 0.01 weight percent to about 0.25 weight percent of the total composition.

UV dye is a useful component for detecting leaks of the composition by permitting one to observe the fluorescence of the dye at or in the vicinity of a leak point in an apparatus (e.g., refrigeration unit, air-conditioner or heat pump). The UV emission, e.g., fluorescence from the dye may be observed under an ultra-violet light Therefore, if a composition containing such a UV dye is leaking from a given point in an apparatus, the fluorescence can be detected at the leak point, or in the vicinity of the leak point.

Another non-refrigerant component which may be used with the compositions of the present invention may include at least one solubilizing agent selected to improve the solubility of one or more dye in the disclosed compositions. In some embodiments, the weight ratio of dye to solubilizing agent ranges from about 99:1 to about 1:1. The solubilizing agents include at least one compound selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers and 1,1,1-trifluoroalkanes and mixtures thereof, meaning mixtures of any of the solubilizing agents disclosed in this paragraph.

In some embodiments, the non-refrigerant component comprises at least one compatibilizer to improve the compatibility of one or more lubricants with the disclosed compositions. The compatibilizer may be selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, 1,1,1-trifluoroalkanes, and mixtures thereof, meaning mixtures of any of the compatibilizers disclosed in this paragraph.

The solubilizing agent and/or compatibilizer may be selected from the group consisting of hydrocarbon ethers consisting of the ethers containing only carbon, hydrogen and oxygen, such as dimethyl ether (DME) and mixtures thereof, meaning mixtures of any of the hydrocarbon ethers disclosed in this paragraph.

The compatibilizer may be linear or cyclic aliphatic or aromatic hydrocarbon compatibilizer containing from 6 to 15 carbon atoms. The compatibilizer may be at least one hydrocarbon, which may be selected from the group consisting of at least hexanes, octanes, nonane, and decanes, among others. Commercially available hydrocarbon compatibilizers include but are not limited to those from Exxon Chemical (USA) sold under the trademarks Isopar® H, a mixture of undecane ($C_{11}$) and dodecane ($C_{12}$) (a high purity $C_{11}$ to $C_{12}$ iso-paraffinic), Aromatic 150 (a $C_9$ to $C_{11}$ aromatic), Aromatic 200 (a $C_9$ to $C_{15}$ aromatic) and Naphtha 140 (a mixture of $C_5$ to $C_{11}$ paraffins, naphthenes and aromatic hydrocarbons) and mixtures thereof, meaning mixtures of any of the hydrocarbons disclosed in this paragraph.

The compatibilizer may alternatively be at least one polymeric compatibilizer. The polymeric compatibilizer may be a random copolymer of fluorinated and non-fluorinated acrylates, wherein the polymer comprises repeating units of at least one monomer represented by the formulae $CH_2$=$C(R)CO_2R^2$, $CH_2$=$C(R^3)C_6H_4R^4$, and $CH_2$=$C(R^6)C_6H_4XR^6$, wherein X is oxygen or sulfur; $R^1$, $R^3$, and $R^5$ are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups and mixtures thereof. Examples of such polymeric compatibilizers include those commercially available from E. I. du Pont de Nemours and Company, under the trademark Zonyl® PHS. Zonyl® PHS is a random copolymer made by polymerizing 40 weight percent $CH_2$=$C(CH_3)CO_2CH_2CH_2(CF_2CF_2)_mF$ (also referred to as Zonyl® fluoromethacrylate or ZFM) wherein m is from 1 to 12, primarily 2 to 8, and 60 weight percent lauryl methacrylate ($CH_2$=$C(CH_3)CO_2(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

Another non-refrigerant component which may be used with the compositions of the present invention may be a metal surface deactivator. The metal surface deactivator is selected from the group consisting of areoxalyl bis(benzylidene)hydrazide (CAS reg no. 6629-10-3), N,N'-bis(3,5-di-tert-butyl-4-hydroxyhydrocinnamoylhydrazine (CAS reg no. 32687-78-8), 2,2'-oxamidobis-ethyl-(3,5-di-tert-butyl-4-hydroxyhydrocinnarnate (CAS rag no. 70331-94-1), N,N'-(disalicyclidene)-1,2-diaminopropane (CAS reg no. 94-91-7) and ethylenediaminetetraacetic acid (CAS reg no, 60-00-4) and its salts, and mixtures thereof, meaning mixtures of any of the metal surface deactivators disclosed in this paragraph.

The non-refrigerant component used with the compositions of the present invention may alternatively be a stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof, meaning mixtures of any of the stabilizers disclosed in this paragraph.

The stabilizer may be selected from the group consisting of tocopherol; hydroquinone; t-butyl hydroquinone; monothiophosphates; and dithiophosphates, commercially available from Ciba Specialty Chemicals, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl) phosphate; triaryl phosphates including triphenyl phosphate, tricresyl phosphate, and trixylenyl phosphate; and mixed alkyl-aryl phosphates including isopropylphenyl phosphate (PPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad® 620; isopropylated triphenyl phosphates such as those commercially available under the trademarks Durad® 220 and Durad® 110; anisole; 1,4-dimethoxybenzene; 1,4-diethoxybenzene; 1,3,5-trimethoxybenzene; myrcene, alloocimene, limonene (in particular, d-limonene); retinal; pinene; menthol; geraniol; farnesol; phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'- thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2'5'-dihydroxyacetophenone; 2-aminobenzaphenone; 2-chlorobenzophenone; benzyl phenyl sulfide; diphenyl sulfide; dibenzyl sulfide; ionic liquids; and mixtures and combinations thereof.

The additive used with the compositions of the present invention may alternatively be an ionic liquid stabilizer. The ionic liquid stabilizer may be selected from the group consisting of organic salts that are liquid at room temperature (approximately 25° C.), those salts containing cations selected from the group consisting of pyridinium, pyridazinium, pyrimidinium, pyrazinium, imidazolium, pyrazolium, thiazolium, oxazolium and triazolium and mixtures thereof; and anions selected from the group consisting of $[BF_4]—$, $[PF_6]—$, $[SbF_6]—$, $[CF_3SO_3]—$, $[HCF_2CF_2SO_3]—$, $[CF_3HFCCF_2SO_3]—$, $[HCClFCF_2SO_3]—$, $[(CF_3SO_2)_2N]—$, $[(CF_3CF_2SO_2)_2N]—$, $[(CF_3SO_2)_3C]—$, $[CF_3CO_2]—$, and F— and mixtures thereof. In some embodiments, ionic liquid stabilizers are selected from the group consisting of emim $BF_4$ (1-ethyl-3-methylimidazolium tetrafluoraborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In some embodiments, the stabilizer may be a hindered phenol, which is any substituted phenol compound, including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thiobis(2-methyl-6-tert-butylphenol); 4,4'-thiobis(3-methyl-6-tertbutylphenol); 2,2'-thiobis(4-methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2"-methylenebis(4-methyl-6-nonylphenol); 2,2'-isobutylidenebis(4,6-dimethylphenol; 2,2'-methylenebis(4-methyl-6-cyclohexylphenol, 2,2- or 4,4-biphenyldiols including 2,2"-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tertbutylbenzyl)sulfide; bis(3,5-di-tert-butyl-4-hydroxybenzyl) sulfide and mixtures thereof, meaning mixtures of any of the phenols disclosed in this paragraph.

The non-refrigerant component which is used with compositions of the present invention may alternatively be a tracer. The tracer may be two or more tracer compounds from the same class of compounds or from different classes of compounds. In some embodiments, the tracer is present in the compositions at a total concentration of about 50 parts per million by weight (ppm) to about 1000 ppm, based on the weight of the total composition. In other embodiments, the tracer is present at a total concentration of about 50 ppm to about 500 ppm. Alternatively, the tracer is present at a total concentration of about 100 ppm to about 300 ppm.

The tracer may be selected from the group consisting of hydrofluorocarbons (HFCs), deuterated hydrofluorocarbons, perfluorocarbons, fluoroethers, brominated compounds, iodated compounds, alcohols, aldehydes and ketones, nitrous oxide and combinations thereof. Alternatively, the tracer may be selected from the group consisting of fluoroethane, 1,1,-difluoroethane, 1,1,1-trifluoroethane, 1,1,1,3,3,3-hexafluoropropane, 1,1,1,2,3,3,3-heptafluoropropane, 1,1,1,3,3-pentafluoropropane, 1,1,1,3,3-pentafluorobutane, 1,1,1,2,3,4,4,5,5,5-decafluoropentane, 1,1,1,2,2,3,4,5,5,6,6, 7,7,7-tridecafluoroheptane, iodotrifluoromethane, deuterated hydrocarbons, deuterated hydrofluorocarbons, perfluorocarbons, fluoroethers, brominated compounds, iodated compounds, alcohols, aldehydes, ketones, nitrous oxide ($N_2O$) and mixtures thereof. In some embodiments, the tracer is a blend containing two or more hydrofluorocarbons, or one hydrofluorocarbon in combination with one or more perfluorocarbons.

The tracer may be added to the compositions of the present invention in predetermined quantities to allow detection of any dilution, contamination or other alteration of the composition.

The additive which may be used with the compositions of the present invention may alternatively be a perfluoropolyether as described in detail in US 2007-0284555, incorporated herein by reference.

It will be recognized that certain of the additives referenced above as suitable for the non-refrigerant component have been identified as potential refrigerants. However in accordance with this invention, when these additives are used, they are not present at an amount that would affect the novel and basic characteristics of the refrigerant mixtures of this invention. Preferably, the non-flammable refrigerant mixtures and the compositions of this invention containing them, contain no more than about 0.5 weight percent of the refrigerants other than HFO-1234yf, HFC-32, HFC-125, HFC-134a, and when present HFO-1234ze.

In one embodiment, the compositions disclosed herein may be prepared by any convenient method to combine the desired amounts of the individual components. A preferred method is to weigh the desired component amounts and thereafter combine the components in an appropriate vessel. Agitation may be used, if desired.

Compositions of the present invention have zero ozone depletion potential and low global warming potential (GWP). Additionally, the compositions of the present invention will have global warming potentials that are less than many hydrofluorocarbon refrigerants currently in use. One aspect of the present invention is to provide a refrigerant with a global warming potential of less than 1000, less than 700, less than 500, less than 400, less than 300, less than 150, less than 100, or less than 50.

Apparatus, Methods and Processes of Use

The compositions disclosed herein are useful as heat transfer compositions or refrigerants.

Vapor-compression refrigeration systems include an evaporator, a compressor, a condenser, and an expansion device. A refrigeration cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator, by withdrawing heat from the environment, at a low temperature to form a gas and produce cooling. Often air or a heat transfer fluid flows over or around the evaporator to transfer the cooling effect caused by the evaporation of the refrigerant in the evaporator to a body to be cooled. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

In one embodiment, disclosed herein is a process for producing cooling comprising condensing a refrigerant mixture as disclosed herein and thereafter evaporating said composition in the vicinity of a body to be cooled.

A body to be cooled may be defined as any space, location, object or body from which it is desirable to be cooled. Examples include spaces (open or enclosed) requiring refrigeration or cooling, such as refrigerator or freezer cases in a supermarket.

By vicinity is meant that the evaporator of the system containing the refrigerant mixture is located either within or adjacent to the body to be cooled, such that air moving over the evaporator would move into or around the body to be cooled.

Non-flammable refrigerant mixtures useful in the process for producing cooling consist essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and optionally (e) from about 0.0001 weight percent to 10 weight percent HFO-1234ze.

In another embodiment, non-flammable refrigerant mixtures useful in the process for producing cooling consist essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and (e) from about 0.0001 weight percent to 10 weight percent trans-HFO-1234ze.

In another embodiment, the non-flammable refrigerant mixtures useful in the process for producing cooling contain from about 0.0001 weight percent to 5 weight percent HFO-1234ze. In another embodiment, the non-flammable refrigerant mixtures contain from about 1 weight percent to 10 weight percent HFO-1234ze. In yet another embodiment, the non-flammable refrigerant mixtures contain from about 1 weight percent to 5 weight percent trans-HFO-1234ze.

In another embodiment, the non-flammable refrigerant mixtures useful in the process for producing cooling comprise (a) from 23 weight percent to 25.5 weight percent HFO-1234yf, (h) from 22 weight percent to 24.5 weight percent HFC-32, (c) from 24.5 weight percent to 27 weight percent HFC-125; (d) from 25.5 weight percent to 28 weight percent HFC-134a; and (e) from about 0.0001 weight percent to 5 weight percent trans-HFO-1234ze.

In another embodiment, the non-flammable refrigerant mixtures useful in the process for producing cooling are azeotrope-like. In particular, the ranges of refrigerant mixtures found to be azeotrope-like are those with from 20 weight percent to 25.5 weight percent HFO-1234yf, from 20 weight percent to 24.5 weight percent HFC-32, from 24.5 weight percent to 30 weight percent HFC-125, and from 25.5 weight percent to 30 weight percent HFC-134a. Additionally, refrigerant mixtures also containing trans-HFO-1234ze are found to be azeotrope-like with from 20 weight percent to 25.5 weight percent HFO-1234yf, from 20 weight percent to 24.5 weight percent HFC-32, from 24.5 weight percent to 30 weight percent HFC-125, from 25.5 weight percent to 30 weight percent HFC-134a and from about 0.0001 weight percent to about 1 weight percent HFO-1234ze.

In another embodiment, the non-flammable refrigerant mixtures useful in the process for producing cooling contain trans-HFO-1234ze from about 0.0001 to about 0.1 weight percent.

In another embodiment, the non-flammable refrigerant mixtures useful in the process for producing cooling are azeotrope-like and trans-HFO-1234ze, when present, is from about 0.0001 to about 0.1 weight percent.

In some embodiments, the refrigerant mixtures as disclosed herein may be useful in particular in refrigeration applications including medium or low temperature refrigeration. Medium temperature refrigeration systems includes supermarket and convenience store refrigerated cases for beverages, dairy, fresh food transport and other items requiring refrigeration. Low temperature refrigeration systems include supermarket and convenience store freezer cabinets and displays, ice machines and frozen food transport. Other specific uses may be in commercial, industrial or residential refrigerators and freezers, ice machines, self-contained coolers and freezers, supermarket rack and distributed systems, walk-in and reach-in coolers and freezers, and combination systems. Of particular note are low temperature refrigeration systems containing the compositions of the present invention.

Additionally, in some embodiments, the disclosed compositions may function as primary refrigerants in secondary loop systems that provide cooling to remote locations by use of a secondary heat transfer fluid, which may comprise water, a glycol, carbon dioxide, or a fluorinated hydrocarbon fluid. In this case the secondary heat transfer fluid is the body to be cooled as it is adjacent to the evaporator and is cooled before moving to a remote body to be cooled.

The compositions disclosed herein may be useful as low GWP (global warming potential) replacements for currently used refrigerants, including R404A (ASHRAE designation for a blend of 44 weight percent R125, 52 weight percent R143a (1,1,1-trifluoroethane), and 4.0 weight percent R134a) and R507 (ASHRAE designation for a blend of 50 weight percent R125 and 50 weight percent R143a).

Often replacement refrigerants are most useful if capable of being used in the original refrigeration equipment designed for a different refrigerant. Additionally, the compositions as disclosed herein may be useful as replacements for R404A or R507 in equipment designed for R404A or for R507 with some system modifications. Further, the compositions as disclosed herein comprising HFO-1234yf, HFC-32, HFC-125, HFC-134a, and optionally HFO-1234ze may be useful for replacing R404A or R507 in equipment specifically modified for or produced entirely for these new compositions comprising HFO-1234yf, HFC-32, HFC-125, HFC-134a, and optionally HFO-1234ze.

In many applications, some embodiments of the disclosed compositions are useful as refrigerants and provide at least comparable cooling performance (meaning cooling capacity and energy efficiency) as the refrigerant for which a replacement is being sought.

In another embodiment is provided a method for replacing a refrigerant selected from the group consisting of R-404A and R-507. The method comprises charging a refrigeration apparatus with a refrigerant mixture comprising HFO-1234yf, HFC-32, HFC-125, HFC-134a, and optionally HFO-1234ze as described herein. In one embodiment the refrigeration apparatus is suitable for use with R-404A and/or R-507. In another embodiment the refrigeration apparatus includes systems with evaporating temperatures in the range of from about −40° C. to about 0° C. Of note are embodiments wherein the refrigeration apparatus includes systems with evaporating temperatures in the range of from about −40° C. to about −20° C. Also of note are embodiments wherein the refrigeration apparatus includes systems with evaporating temperatures in the range of from about −20° C. to about 0° C.

Non-flammable refrigerant mixtures useful in the method from replacing a refrigerant consist essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and optionally (e) from about 0.0001 weight percent to 10 weight percent HFO-1234ze.

In another embodiment, non-flammable refrigerant mixtures useful in the method from replacing a refrigerant consist essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and (e) from about 0.0001 weight percent to 10 weight percent trans-HFO-1234ze.

In another embodiment, the non-flammable refrigerant mixtures useful in the method from replacing a refrigerant contain from about 0.0001 weight percent to 5 weight percent HFO-1234ze. In another embodiment, the non-flammable refrigerant mixtures contain from about 1 weight percent to 10 weight percent HFO-1234ze. In yet another embodiment, the non-flammable refrigerant mixtures contain from about 1 weight percent to 5 weight percent trans-HFO-1234ze.

In another embodiment, the non-flammable refrigerant mixtures useful in the method from replacing a refrigerant comprise (a) from 23 weight percent to 25.5 weight percent HFO-1234yf, (b) from 22 weight percent to 24.5 weight percent HFC-32, (c) from 24.5 weight percent to 27 weight percent HFC-125; (d) from 25.5 weight percent to 28 weight percent HFC-134a; and (e) from about 0.0001 weight percent to 5 weight percent trans-HFO-1234ze.

In another embodiment, the non-flammable refrigerant mixtures useful in the method from replacing a refrigerant are azeotrope-like. In particular, the ranges of refrigerant mixtures found to be azeotrope-like are those with from 20 weight percent to 25.5 weight percent HFO-1234yf, from 20 weight percent to 24.5 weight percent HFC-32, from 24.5 weight percent to 30 weight percent HFC-125, and from 25.5 weight percent to 30 weight percent HFC-134a. Additionally, refrigerant mixtures also containing trans-HFO-1234ze are found to be azeotrope-like with from 20 weight percent to 25.5 weight percent HFO-1234yf, from 20 weight percent to 24.5 weight percent HFC-32, from 24.5 weight percent to 30 weight percent HFC-125, from 25.5 weight percent to 30 weight percent HFC-134a and from about 0.0001 weight percent to about 1 weight percent HFO-1234ze.

In another embodiment, the non-flammable refrigerant mixtures useful in the method from replacing a refrigerant contain trans-HFO-1234ze from about 0.0001 to about 0.1 weight percent.

In another embodiment, the non-flammable refrigerant mixtures useful in the method from replacing a refrigerant are azeotrope-like and trans-HFO-1234ze, when present, is from about 0.0001 to about 0.1 weight percent.

In another embodiment is provided a method for recharging a heat transfer system that contains a refrigerant to be replaced and a lubricant, said method comprising removing the refrigerant to be replaced from the heat transfer system while retaining a substantial portion of the lubricant in said system and introducing one of the compositions herein disclosed to the heat transfer system.

In another embodiment, a heat exchange system comprising a composition disclosed herein is provided, wherein said system is selected from the group consisting of freezers, refrigerators, walk-in coolers, super market refrigeration or freezer systems, mobile refrigerators, and systems having combinations thereof.

In one embodiment, there is provided a heat transfer system containing a composition as disclosed herein. In another embodiment is disclosed a refrigeration apparatus containing a composition as disclosed herein. In another embodiment, is disclosed a stationary refrigeration apparatus containing a composition as disclosed herein. In a particular embodiment, is disclosed a medium temperature refrigeration apparatus containing the composition of the present invention. In another particular embodiment, is disclosed a low temperature refrigeration apparatus containing the composition of the present invention. The apparatus typically includes an evaporator, a compressor, a condenser, and an expansion device.

In yet another embodiment is disclosed a mobile refrigeration apparatus containing a composition as disclosed herein.

Non-flammable refrigerant mixtures useful in the heat exchange systems, heat transfer systems or refrigeration apparatus consist essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and optionally (e) from about 0.0001 weight percent to 10 weight percent HFO-1234ze.

In another embodiment, non-flammable refrigerant mixtures useful in the heat exchange systems, heat transfer systems or refrigeration apparatus consist essentially of (a) from 20 weight percent to 25.5 weight percent HFO-1234yf, (b) from 20 weight percent to 24.5 weight percent HFC-32, (c) from 24.5 weight percent to 30 weight percent HFC-125 (d) from 25.5 weight percent to 30 weight percent HFC-134a, and (e) from about 0.0001 weight percent to 10 weight percent trans-HFO-1234ze.

In another embodiment, the non-flammable refrigerant mixtures useful in the heat exchange systems, heat transfer systems or refrigeration apparatus contain from about 0.0001 weight percent to 5 weight percent HFO-1234ze. In another embodiment, the non-flammable refrigerant mixtures contain from about 1 weight percent to 10 weight percent HFO-1234ze. In yet another embodiment, the non-flammable refrigerant mixtures contain from about 1 weight percent to 5 weight percent trans-HFO-1234ze.

In another embodiment, the non-flammable refrigerant mixtures useful in the heat exchange systems, heat transfer systems or refrigeration apparatus comprise (a) from 23 weight percent to 25.5 weight percent HFO-1234yf, (b) from 22 weight percent to 24.5 weight percent HFC-32, (c) from 24.5 weight percent to 27 weight percent HFC-125; (d) from 25.5 weight percent to 28 weight percent HFC-134a; and (e) from about 0.0001 weight percent to 5 weight percent trans-HFO-1234ze.

In another embodiment, the non-flammable refrigerant mixtures useful in the heat exchange systems, heat transfer systems or refrigeration apparatus are azeotrope-like. In particular, the ranges of refrigerant mixtures found to be azeotrope-like are those with from 20 weight percent to 25.5 weight percent HFO-1234yf, from 20 weight percent to 24.5 weight percent HFC-32, from 24.5 weight percent to 30 weight percent HFC-125, and from 25.5 weight percent to 30 weight percent HFC-134a. Additionally, refrigerant mixtures also containing trans-HFO-1234ze are found to be azeotrope-like with from 20 weight percent to 25.5 weight percent HFO-1234yf, from 20 weight percent to 24.5 weight percent HFC-32, from 24.5 weight percent to 30 weight percent HFC-125, from 25.5 weight percent to 30 weight percent HFC-134a and from about 0.0001 weight percent to about 1 weight percent HFO-1234ze.

In another embodiment, the non-flammable refrigerant mixtures useful in the heat exchange systems, heat transfer systems or refrigeration apparatus contain trans-HFO-1234ze from about 0.0001 to about 0.1 weight percent.

In another embodiment, the non-flammable refrigerant mixtures useful in the heat exchange systems, heat transfer systems or refrigeration apparatus are azeotrope-like and trans-HFO-1234ze, when present, is from about 0.0001 to about 0.1 weight percent.

EXAMPLES

The concepts disclosed herein will be further described in the following examples, which do not limit the scope of the invention described in the claims.

Example 1

Impact of Vapor Leakage

A vessel is charged to 90% full with an initial composition at the indicated temperature, and the initial vapor pressure of the composition is measured. The composition is allowed to leak from the vessel, while the temperature is held constant, until 50 weight percent of the initial composition is removed, at which time the vapor pressure of the composition remaining in the vessel is measured. Vapor pressure changes are listed in Table 1.

TABLE 1

| Composition wt % | Initial P (Psia) | Initial P (kPa) | After 50% Leak (Psia) | After 50% Leak (kPa) | Delta P (%) |
|---|---|---|---|---|---|
| HFO-1234yf/HFC-32/HFC-125/HFC-134a (at 25° C.) | | | | | |
| 25/24/25/26 | 182.4 | 1258 | 165.6 | 1142 | 9.2% |
| 20/20/30/30 | 176.9 | 1220 | 160.7 | 1108 | 9.2% |
| 25.5/24.5/24.5/25.5 | 183.2 | 1263 | 166.3 | 1147 | 9.2% |
| 25/22/26/27 | 179.2 | 1236 | 162.3 | 1119 | 9.4% |
| 23/22/27/28 | 179.4 | 1237 | 162.8 | 1122 | 9.3% |
| HFO-1234yf/HFC-32/HFC-125/HFC-134a/trans-HFO-1234ze (at 25° C.) | | | | | |
| 24.9999/24/25/26/0.0001 | 182.4 | 1258 | 165.6 | 1142 | 9.2% |
| 24.999/24/25/26/0.001 | 182.4 | 1258 | 165.6 | 1142 | 9.2% |
| 24.99/24/25/26/0.01 | 182.4 | 1258 | 165.5 | 1141 | 9.3% |
| 24.9/24/25/26/0.1 | 182.2 | 1256 | 165.2 | 1139 | 9.3% |
| 24/24/25/26/1 | 181.1 | 1249 | 163.5 | 1127 | 9.7% |

TABLE 1-continued

| Composition wt % | Initial P (Psia) | Initial P (kPa) | After 50% Leak (Psia) | After 50% Leak (kPa) | Delta P (%) |
|---|---|---|---|---|---|
| Comparative HFC-1234yf/HFC-32/HFC-125/HFC-134a (at 25° C.) | | | | | |
| 45/10/10/35 | 141.1 | 973 | 125.5 | 865 | 11.1% |
| 50/10/20/20 | 150.9 | 1040 | 134.0 | 924 | 11.2% |
| 40/15/10/35 | 153.2 | 1056 | 134.9 | 930 | 11.9% |
| 30/15/20/35 | 159.4 | 1099 | 142.2 | 980 | 10.8% |

The compositions as defined by the present invention are found to be azeotrope-like with less than 10% change in the vapor pressure after 50% of the composition is leaked.

Example 2

Flammability

Flammable mixtures may be identified by testing under ASTM (American Society of Testing and Materials) E681-04, with an electronic ignition source. Such tests of flammability were conducted on refrigerant mixtures at 50 percent relative humidity.

In order to determine a flammability boundary, the flammability of two refrigerant mixtures was determined in both the liquid and vapor phases at −36° C. (10 degrees above the bubble point, as designated in ASHRAE Standard 34) for a container that is 90% liquid filled. The compositions contained HFO-1234yf/HFC-32HFC-125HFC-134a at the concentrations given in the Table 2.

TABLE 2

| Liquid phase (wt %) | | Vapor phase (wt %) | |
|---|---|---|---|
| 25.5/24.5/24.5/25.5 | Non-flammable | 18/40/30/12 | Non-flammable |
| 25.5/25.5/23.5/25.5 | Non-flammable | 18/41/29/12 | Flammable |

Clearly compositions with more than about 24.5 weight percent HFC-32 and less than about 24.5 weight percent HFC-125 would be classified as flammable refrigerants.

Example 3

Refrigeration Performance

Table 3 shows the performance of some exemplary compositions as compared to R-404A. In Table 3, Evap Temp is evaporator temperature, Evap Pres is evaporator pressure, Cond Pres is condenser pressure, Compr Exit Temp is compressor exit temperature (also sometimes called compressor discharge temperature), COP is coefficient of performance (analogous to energy efficiency), and CAP is volumetric cooling capacity. The data are based on the following conditions.

| | |
|---|---|
| Condenser temperature | 40° C. |
| Subcool amount | 10K |
| Compressor efficiency is | 75% |

TABLE 3

| | wt % | Evap Temp (° C.) | Return Gas Temp (° C.) | Evap Pressure (kPa) | Cond Pressure (kPa) | Compr Exit Temp (° C.) | COP | Capacity (kJ/m$^3$) | COP Rel to R404A | Cap Rel to R404A |
|---|---|---|---|---|---|---|---|---|---|---|
| R-404A | 100 | −40 | −20 | 134 | 1833 | 88 | 1.48 | 751 | 100% | 100% |
| 32/125/134a/1234yf | 24/25/26/25 | −40 | −20 | 111 | 1736 | 110 | 1.53 | 707 | 104% | 94% |
| 32/125/134a/1234yf/t-1234ze | 24/25/26/24.9/0.1 | −40 | −20 | 111 | 1736 | 110 | 1.53 | 706 | 104% | 94% |
| 32/125/134a/1234yf/t-1234ze | 24/25/26/20/5 | −40 | −20 | 107 | 1718 | 111 | 1.53 | 695 | 104% | 92% |
| R-404A | 100 | −25 | −5 | 251 | 1833 | 80 | 2.11 | 1478 | 100% | 100% |
| 32/125/134a/1234yf | 24/25/26/25 | −25 | −5 | 215 | 1736 | 96 | 2.17 | 1416 | 103% | 96% |
| 32/125/134a/1234yf/t-1234ze | 24/25/26/24.9/0.1 | −25 | −5 | 215 | 1736 | 96 | 2.17 | 1415 | 103% | 96% |
| 32/125/134a/1234yf/t-1234ze | 24/25/26/20/5 | −25 | −5 | 211 | 1718 | 97 | 2.17 | 1397 | 103% | 95% |
| R-404A | 100 | −15 | 5 | 365 | 1833 | 76 | 2.74 | 2221 | 100% | 100% |
| 32/125/134a/1234yf | 24/25/26/25 | −15 | 5 | 320 | 1736 | 89 | 2.80 | 2145 | 102% | 97% |
| 32/125/134a/1234yf/t-1234ze | 24/25/26/24.9/0.1 | −15 | 5 | 320 | 1736 | 89 | 2.80 | 2145 | 102% | 97% |
| 32/125/134a/1234yf/t-1234ze | 24/25/26/20/5 | −15 | 5 | 314 | 1718 | 89 | 2.80 | 2121 | 102% | 95% |
| R-404A | 100 | −5 | 15 | 516 | 1833 | 72 | 3.66 | 3244 | 100% | 100% |
| 32/125/134a/1234yf | 24/25/26/25 | −5 | 15 | 460 | 1736 | 83 | 3.72 | 3152 | 101% | 97% |
| 32/125/134a/1234yf/t-1234ze | 24/25/26/24.9/0.1 | −5 | 15 | 460 | 1736 | 83 | 3.72 | 3151 | 101% | 97% |
| 32/125/134a/1234yf/t-1234ze | 24/25/26/20/5 | −5 | 15 | 453 | 1718 | 83 | 3.72 | 3119 | 101% | 96% |

Results show compositions of the present invention exhibit cooling capacity which is comparable to R-404A which also demonstrates these compositions may be suitable to retrofit an existing R-404A system or be useful in new refrigeration systems. The compositions also exhibit higher energy efficiency than R-404A.

Example 4

Refrigeration Performance

Table 4 shows the performance of some exemplary compositions as compared to R404A and comparative Examples (A) and (B). In Table 4, Evap Pres is evaporator pressure, Cond Pres is condenser pressure, Compr Exit Temp is compressor exit temperature (also sometimes called compressor discharge temperature), COP is coefficient of performance (analogous to energy efficiency), and CAP is volumetric cooling capacity. The data are based on the following conditions.

| | |
|---|---|
| Evaporator temperature | −10° C. |
| Return Gas temperature | 10° C. |
| Condenser temperature | 40° C. |
| Subcool amount | 10K |
| Compressor efficiency is | 75% |

Results show that the compositions of the present invention provide improved energy efficiency relative to R-404A. Additionally, the compositions of the present invention provide cooling capacity within only a few percent of that for R-404A. Note that comparative example (B) falls well short of the cooling capacity of the other compositions. Also note that comparative example (A) while providing similar cooling performance, shows a higher compressor exit temperature. Higher compressor temperatures are expected to reduce compressor life, thus increasing the cost of operation of a system.

SELECTED EMBODIMENTS

Embodiment A1

A non-flammable refrigerant mixture consisting essentially of:
a. from 20 weight percent to 25.5 weight percent HFO-1234yf;
b. from 20 weight percent to 24.5 weight percent HFC-32;
c. from 24.5 weight percent to 30 weight percent HFC-125;
d. from 25.5 weight percent to 30 weight percent HFC-134a; and optionally
e. from about 0.0001 weight percent to about 10 weight percent trans-HFO-1234ze.

TABLE 4

| | wt % | Evap Pressure (kPa) | Cond Pressure (kPa) | Compr Exit Temp (° C.) | COP | Capacity (kJ/m$^3$) | COP Rel to R404A | Cap Rel to R404A |
|---|---|---|---|---|---|---|---|---|
| R-404A | 100 | 436 | 1833 | 74 | 3.16 | 2694 | 100% | 100% |
| 32/125/134a/1234yf | 24/25/26/25 | 387 | 1741 | 85 | 3.22 | 2628 | 102% | 98% |
| 32/125/134a/1234yf/t-1234ze | 24/25/26/24.9/0.1 | 387 | 1740 | 85 | 3.22 | 2627 | 102% | 98% |
| 32/125/134a/1234yf/t-1234ze | 24/25/26/20/5 | 378 | 1713 | 86 | 3.23 | 2587 | 102% | 96% |
| 32/125/134a/1234yf/t-1234ze | 24/25/26/24/1 | 385 | 1735 | 85 | 3.22 | 2620 | 102% | 97% |
| 32/125/134a/1234yf/t-1234ze | 25/26/20/24/5 | 391 | 1755 | 86 | 3.22 | 2648 | 102% | 98% |
| 32/125/134a/1234yf/t-1234ze | 20/30/25.5/20.5/4 | 371 | 1685 | 83 | 3.23 | 2533 | 102% | 94% |
| 32/125/134a/1234yf/t-1234ze Comparative | 22/26/28/23/1 | 376 | 1702 | 84 | 3.23 | 2566 | 102% | 95% |
| 32/125/134a/1234yf/t-1234ze (A) | 30/30/16.8/7.2/16 | 398 | 1803 | 90 | 3.21 | 2729 | 102% | 101% |
| 32/125/134a/1234yf/t-1234ze (B) | 12.5/12.5/31.5/13.5/30 | 270 | 1307 | 81 | 3.31 | 1974 | 105% | 73% |

Embodiment A1a

A non-flammable refrigerant mixture of Embodiment A1 consisting essentially of:
 a. from 20 weight percent to 25.5 weight percent HFO-1234yf;
 b. from 20 weight percent to 24.5 weight percent HFC-32;
 c. from 24.5 weight percent to 30 weight percent HFC-125;
 d. from 25.5 weight percent to 30 weight percent HFC-134a; and
 e. from about 0.0001 weight percent to about 10 weight percent trans-HFO-1234ze.

Embodiment A2

A non-flammable refrigerant mixture of Embodiment A1 comprising:
 a. from 23 weight percent to 25.5 weight percent HFO-1234yf;
 b. from 22 weight percent to 24.5 weight percent HFC-32;
 c. from 24.5 weight percent to 27 weight percent HFC-125; and
 d. from 25.5 weight percent to 28 weight percent HFC-134a.

Embodiment A3

A non-flammable refrigerant mixture of any of Embodiments A1-A2 wherein trans-HFO-1234ze is present.

Embodiment A4

A non-flammable refrigerant mixture of any of Embodiments A1-A2 wherein trans-HFO-1234ze is not present.

Embodiment A5

A non-flammable refrigerant mixture of any of Embodiments A1-A4 which is azeotrope-like.

Embodiment A6

A non-flammable refrigerant mixture of any of Embodiments A1-A5 wherein trans-HFO-1234ze when present is from about 0.0001 to about 5.0 weight percent.

Embodiment A7

A non-flammable refrigerant mixture of Embodiment A6 which when used as a refrigerant in a refrigeration system having an evaporator temperature from about −40 to 0° C. has a capacity within 10% of the capacity for R-404A at the same evaporator temperature.

Embodiment A8

A non-flammable refrigerant mixture of Embodiment A7 which when used as a refrigerant in a refrigeration system having an evaporator temperature from about −40 to −20° C. has a capacity within 10% of the capacity for R-404A at the same evaporator temperature.

Embodiment A9

A non-flammable refrigerant mixture of any of Embodiments A1-A8 wherein trans-HFO-1234ze when present is from about 0.0001 to about 1.0 weight percent.

Embodiment A10

A non-flammable refrigerant mixture of any of Embodiments A1-A9 wherein trans-HFO-1234ze when present is from about 0.0001 to about 0.1 weight percent.

Embodiment A11

A non-flammable refrigerant mixture of any of Embodiments A1-A11 wherein the HFO-1234ze when present is at least about 80% trans-HFO-1234ze.

Embodiment A11a

A non-flammable refrigerant mixture of any of Embodiments A1-A10 wherein the HFO-1234ze when present is at least about 90% trans-HFO-1234ze.

Embodiment A12

A non-flammable refrigerant mixture of any of Embodiments A1-A11 wherein the weight ratio of HFC-134a to HFO-1234yf is greater than 1:1.

Embodiment A13

A non-flammable refrigerant mixture of any of Embodiments A1-A12 wherein HFO-1234yf is about 25 weight percent of the refrigerant mixture and wherein the HFC-134a is about 26 weight percent of the refrigerant mixture.

Embodiment A14

A non-flammable refrigerant mixture of any of Embodiments A1-A13 containing no more than about 0.5 weight percent of refrigerants other than HFO-1234yf, HFC-32, HFC-125, HFC-134a and when present trans-HFO-1234ze.

Embodiment B1

A composition consisting of:
 (i) a non-flammable refrigerant component; and optionally
 (ii) a non-refrigerant component;
wherein the refrigerant component is a non-flammable refrigerant mixture of any one of Embodiments A1-A14.

Embodiment B2

A composition of Embodiment B1 wherein the non-refrigerant component is not present.

Embodiment B3

A composition of Embodiment B1 wherein the non-refrigerant component is present.

Embodiment B4

A composition of any one of Embodiments B1-B3 wherein the non-refrigerant component if present is selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof.

Embodiment B4a

A composition of any of Embodiments B1-B4 wherein the non-refrigerant component is a lubricant selected from the group consisting of mineral oil, alkyl substituted aromatics, alkylbenzenes, synthetic paraffins and napthenes, poly (alpha olefins), polyglycols, polyalkylene glycols, dibasic acid esters, polyesters, polyol esters, neopentyl esters, polyvinyl ethers, perfluoropolyethers, silicones, silicate esters, fluorinated compounds, phosphate esters, polycarbonates and mixtures thereof.

Embodiment B5

A composition of any of Embodiments B1-B4 containing no more than about 0.5 weight percent of refrigerants other than HFO-1234yf, HFC-32, HFC-125, HFC-134a and when present trans-HFO-1234ze Embodiment C1

A process for producing cooling comprising condensing a refrigerant mixture of any of Embodiments A1-A14 and thereafter evaporating said refrigerant mixture in the vicinity of a body to be cooled.

Embodiment D1

A method for replacing a refrigerant selected from the group consisting of R-404A and R-507 comprising charging a refrigeration apparatus with a refrigerant mixture of any one of Embodiments A1-A14 or charging a composition of any one of Embodiments B1-B4.

Embodiment D2

A method of Embodiment D1 wherein R-404A is replaced.

Embodiment D3

A method of Embodiment D1 wherein R-507 is replaced.

Embodiment E1

A refrigeration apparatus containing a refrigerant mixture of any one of Embodiments A1-A14 or a composition of any one of Embodiments B1-B4.

What is claimed is:
1. A non-flammable refrigerant mixture consisting of:
   a. from 23 weight percent to 25.5 weight percent HFO-1234yf;
   b. from 22 weight percent to 24.5 weight percent HFC-32;
   c. from 24.5 weight percent to 27 weight percent HFC-125; and
   d. from 25.5 weight percent to 28 weight percent HFC-134a.
2. A process for producing cooling comprising condensing a refrigerant mixture of claim 1 and thereafter evaporating said composition in the vicinity of a body to be cooled.
3. A method for replacing a refrigerant selected from the group consisting of R-404A and R-507 comprising charging a refrigeration apparatus with a refrigerant mixture of claim 1.
4. A refrigeration apparatus containing a refrigerant mixture of claim 1.
5. A composition consisting of:
   (i) a non-flammable refrigerant mixture; and
   (ii) a non-refrigerant component;
   wherein the refrigerant mixture consists of:
   a. from 23 weight percent to 25.5 weight percent HFO-1234yf;
   b. from 22 weight percent to 24.5 weight percent HFC-32;
   c. from 24.5 weight percent to 27 weight percent HFC-125; and
   d. from 25.5 weight percent to 28 weight percent HFC-134a.
6. The composition of claim 5 wherein the non-refrigerant component is selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof.
7. A composition of claim 6 wherein the non-refrigerant component is a lubricant selected from the group consisting of mineral oil, alkyl substituted aromatics, alkylbenzenes, synthetic paraffins and napthenes, poly (alpha olefins), polyglycols, polyalkylene glycols, dibasic acid esters, polyesters, polyol esters, neopentyl esters, polyvinyl ethers, perfluoropolyethers, silicones, silicate esters, fluorinated compounds, phosphate esters, polycarbonates and mixtures thereof.
8. A method for replacing a refrigerant selected from the group consisting of R-404A and R-507 comprising charging a refrigeration apparatus with a composition of claim 5.
9. A refrigeration apparatus containing a composition of claim 5.

* * * * *